United States Patent [19]

Taylor et al.

[11] Patent Number: 5,599,437
[45] Date of Patent: Feb. 4, 1997

[54] ELECTROLYSIS OF ELECTROACTIVE SPECIES USING PULSED CURRENT

[75] Inventors: E. Jennings Taylor, Troy; Chengdong Zhou, Centerville; Robert P. Renz, Centerville; Mahendra K. Sunkara, Fairborn, all of Ohio

[73] Assignee: Faraday Technology, Inc., Dayton, Ohio

[21] Appl. No.: 492,519

[22] Filed: Jun. 20, 1995

[51] Int. Cl.⁶ .................................................. C02F 1/461
[52] U.S. Cl. ........................... 205/744; 205/754; 205/758; 205/760; 205/771; 205/772
[58] Field of Search .................................. 205/744, 754, 205/758, 760, 771, 772

[56] References Cited

U.S. PATENT DOCUMENTS

| | | | |
|---|---|---|---|
| 3,766,034 | 10/1973 | Veltman | 204/149 |
| 3,884,782 | 5/1975 | Pittman et al. | 204/108 |
| 3,928,152 | 12/1975 | Harvey et al. | 204/106 |
| 3,957,504 | 5/1976 | Ho et al. | 75/101 BE |
| 4,043,377 | 10/1977 | Schlain et al. | 204/106 |
| 4,141,804 | 2/1979 | Avedesian et al. | 204/105 R |
| 4,146,447 | 3/1979 | Houlachi et al. | 204/130 |
| 4,169,029 | 9/1979 | Smirnov et al. | 204/149 |
| 4,216,064 | 8/1980 | Penchev et al. | 204/1 T |
| 4,396,474 | 8/1983 | Astruc et al. | 204/105 R |
| 4,597,842 | 7/1986 | Evans | 204/130 |
| 4,800,005 | 1/1989 | Rosenfield et al. | 204/109 |
| 4,913,779 | 3/1990 | Lacoste | 204/1.11 |
| 5,049,248 | 9/1991 | Muralidhara et al. | 204/180.1 |
| 5,200,054 | 4/1993 | Glenn et al. | 205/74 |

FOREIGN PATENT DOCUMENTS

| | | |
|---|---|---|
| 1412438 | 8/1965 | France . |
| 7009816 | 1/1972 | Netherlands . |
| 387026 | 11/1973 | U.S.S.R. . |
| 565951 | 8/1977 | U.S.S.R. . |
| 602611 | 3/1978 | U.S.S.R. . |
| 1157686 | 7/1969 | United Kingdom . |
| 2127852 | 4/1984 | United Kingdom . |

OTHER PUBLICATIONS

Baily, D., et al., Plating and Surface Finishing, vol. 75(4), pp. 26–31 (1988 Apr.).
Giordano, N. et al., Electrochimica Acta, vol. 35(9), pp. 1411–1421 (1990).
Walsh, F. C. et al., Transactions of the Institution of Chemical Engineers, vol. 68, pp. 107–114 (1990 May).
Zhou, C. D. et al. Plating and Surface Finishing, vol. 80, pp. 69–78 (1993 Jun).
Ibl, N., "Current Distribution in Pulse Plating", Proceedings of AESF 2nd Int'l. Pulse Plating Symposium (1981).
Chin, D.-T., J. Electrochem. Soc., vol. 130, pp. 1657–1667 Aug. & 1983) (best copy available).
Chin, D. T., et al., Electrochimica Acta, vol. 37(11), pp. 1927–1934 (1992).
Vilambi, N. R. K. et al., Plating and Surface Finishing, vol. 75, pp. 67–73 (Jan. & 1988).
Zhou, C. D. et al., Plating and Surface Finishing, vol. 81, pp. 70–78 (1994 & Jun.).

Primary Examiner—Arun S. Phasge
Attorney, Agent, or Firm—Vorys, Sater, Seymour and Pease

[57] ABSTRACT

A waste solution containing electroactive species, e.g., metal ions, can be remediated to very low levels of contaminant by an electrolysis method including the steps of introducing an electrolyte containing an electroactive species into an electrolytic cell having a cathode and an anode, producing a flow of the electrolyte past at least one of the electrodes at an electrolyte flow rate, and passing an electric current through the solution between the anode and the cathode whereby the electroactive species undergoes an electrochemical reaction at one of the electrodes at an electrochemical reaction rate, using an electric current pulsed at a frequency of 0.5 to 1000 Hertz and a duty cycle of not greater than 50%, and adjusting the electrolyte flow rate for the pulsed current electrolysis such that the electrochemical reaction rate for pulsed current electrolysis is greater than the electrochemical reaction rate for direct current electrolysis. The method is especially useful in increasing the efficiency of electrolytic remediation of metal-containing waste solutions to low levels of metal ion contaminants. The method is preferably conducted using electrodes having very high surface area, optionally coated with an ion exchange resin.

27 Claims, 7 Drawing Sheets

Cu(II) RECOVERY : 0.5 l/MIN; PC : 10Hz, Iave = 10A

Cu(II) RECOVERY : 0.5 l/MIN; PC : 10Hz, Iave = 10A

Cu(II) RECOVERY : 0.5 l/MIN; PC : 10Hz, Iave = 10A

Cu(II) RECOVERY : 0.5 l/MIN; PC : 10Hz, Iave = 10A

COMPARISON BETWEEN THE BEST PC AND BEST DC
CONDITION : 40 A AVERAGE CURRENT

COMPARISON OF THE BEST PC AND BEST DC : 40 A
AVERAGE CURRENT

ELECTROLYSIS OF ELECTROACTIVE SPECIES USING PULSED CURRENT

ORIGIN OF THE INVENTION

The experimental work leading to this invention was funded in part by the U.S. Government Advanced Research Project Agency Contract No. MDA972-93-C-0036.

BACKGROUND OF THE INVENTION

1. Field of the Invention

This invention relates to methods of purifying waste solutions containing electroactive species and more particularly to methods for purifying such solutions by electrolytic reaction using pulsed current electrolysis. The invention also relates to purification of metal-containing waste solutions by electrolytic deposition of the metal on porous electrodes having a high specific surface area using pulsed current electrolysis.

1. Brief Description of the Prior Art

Waste solutions containing pollutants that are electroactive species can be purified by an electrochemical process wherein the pollutants are destroyed or precipitated by oxidation or reduction at electrodes in contact with the solution.

Waste solutions containing metals in ionic form may be freed of the polluting metal ions by electrodepositing them as free metal at the cathode of an electrochemical cell. The major advantage of the electrochemical method for treating metal-containing waste water is that the metal ions can be recovered in metallic form, without the use of chemical reagents and without the generation of secondary wastes. However, electrochemical purification of metal-containing waste solutions has encountered certain difficulties due to the stringent limits on metal ion concentration that have been imposed by the ever-stricter legal requirements for purity of industrial effluent streams.

Other electroactive species found as pollutants in waste water, e.g., cyanide ions, can be removed by electrochemical oxidation at an anode.

The major challenge to electrochemical processing of low concentration waste water is the low current efficiency and high effluent concentration due to the hydrogen evolution side reaction. The extent of hydrogen evolution is dependent on the electrode potential, the hydrogen overpotential ($\eta_H$) on the metal being deposited and the pH of the solution. The current efficiency for the common case of deposition of a metal ion may be defined as:

$$\text{current efficiency} = i_M/(i_M + i_H)$$

where $i_M$ is the current density for metal deposition and $i_H$ is the current density for hydrogen evolution (A/dm$^2$), and $i_M$ is defined as:

$$i_M = nFk_M C_M$$

where $C_M$ is the concentration of metal ions (mol/L), $k_M$ is the mass transfer coefficient of the metal ion (dm/s), F is the Faraday constant (96,500 C/s) and n is the number of electrons involved in the reaction (eq./mol).

As is known to those skilled in the art, the potential required for deposition of a metal becomes more negative with decreasing metal concentration. For metal-contaminated waste water which must be remediated to low metal ion concentration the actual potential of deposition frequently becomes more negative than the potential for evolution of hydrogen. Consequently, the undesired evolution of hydrogen is likely to occur. Because of the hydrogen evolution reaction, the current efficiency will be relatively low when metals are recovered from dilute solution.

One way to minimize the effect of low metal ion concentration on the efficiency of the electrolytic process is to provide a high mass transfer rate. This is evident from a consideration of the concentration gradients produced in the solution by the electrolytic process. As the metal ions adjacent to the cathode are attracted to it and precipitated the concentration of the metal ions near the cathode is decreased, and the potential required for their deposition becomes more negative. In order to increase the rate of metal deposition the rate of mass transfer from the bulk of the solution to the depleted region adjacent to the electrode must be increased. Evidently the amount of metal ion in the volume adjacent to the cathode can be increased by increasing either the rate at which the ions are moved from the bulk solution to the near-electrode volume or by increasing the area of the electrode itself, thereby increasing the volume of the near-electrode layer. Merely increasing the area of flat plate electrodes would provide some benefit, but at the cost of increasing size and complexity of the electrochemical cell itself. Consequently, efforts at increasing the mass transfer rate in electrochemical cells have concentrated on using forced flow of electrolyte using an external pump, mechanically moving the electrode itself within the solutions, the use of turbulence promoting structures and conditions in flow systems, the use of stirring by gas sparging, and the use of three-dimensional electrodes to provide increased electrode surface area in a given cell volume.

A number of workers have investigated the electrochemical process of metal recovery with a view to improving its efficiency. Baily, D., et al., *Plat. and Surf. Finish.*, 75 (4), p 26 (1988), used porous carbon fiber flow-through electrodes to increase the active surface area of the cathode and hence reduce the mass transfer limitations. However, the power consumption of such an arrangement is too great. In addition, as these flow-through electrodes become blocked with deposited metal, the buildup in pressure drop across the recovery unit can result in leakage and mechanical problems.

More recently, Walsh, F. C., and Gabe, D. R., *Trans. Inst. Chem. Eng.*, 68, p. 107 (1990), approached the mass transport problem of metal recovery by working in a turbulent flow electrochemical reactor. Zhou, C. D., and Chin, D. -T., *Plat. and Surf. Fin.* 80, p. 67 (*1993*), investigated an electrochemical process for simultaneous metal recovery and cyanide destruction using a plating barrel-type cathode and a packed-bed anode. Due to the enhanced mass transfer rate induced by the motion of particles in the plating barrel, metal and cyanide concentration can be reduced to 1 part per million (ppm). However, in this work direct current (DC) electrolysis was used, and eventually, as the metal and cyanide concentration decreased to very low levels, the electrical energy consumption became excessive.

The approach of previous work, such as that described above, has been to circumvent the limitations imposed by mass transport requirements in an electrolytic cell by using a method based on fluid mechanics, i.e., generating turbulent flow by forced pumping, use of turbulence promoting structures, and motion of the electrode itself. It does not appear that enhanced mass transport by varying the electrochemical conditions of the electrolytic process has been used in attempts to remediate waste solutions to very low levels of metal ion concentration.

Pulsed current electrolysis of solutions containing relatively high concentrations of copper ions generated in production of copper by leaching of ores has been used for recovery of copper from the leaching solutions as disclosed in Pittman et al., U.S. Pat. No. 3,884,782. Pittman uses massive electrodes, e.g., stainless steel sheets, on which to plate out the copper rather than porous electrodes. The pulsed current is disclosed as increasing the purity of the deposited copper.

Accordingly a need has continued to exist for a method of increasing the efficiency of electrochemical remediation of waste solutions and particularly for a method of removing metals from dilute waste solutions by electrodeposition.

SUMMARY OF THE INVENTION

This problem has now been alleviated by the method of this invention wherein a waste solution containing electroactive species, e.g., metal ions, is treated by a method comprising introducing a solution containing an electroactive species into an electrolytic cell having a cathode and an anode, producing a flow of said electrolyte past at least one of the electrodes at an electrolyte flow rate, passing an electric current through the solution between the anode and the cathode whereby the electroactive species undergoes an electrochemical reaction at one of the electrodes, cathode or anode, at an electrochemical reaction rate, wherein the electric current is a pulsed current pulsed at a frequency of 0.5 to 1000 Hertz and having a duty cycle of not greater than 50%, and the flow rate is defined as a pulsed current electrolyte flow rate, and adjusting the pulsed current electrolyte flow rate such that the electrochemical reaction rate when the current is pulsed current is greater than the electrochemical reaction rate when the electric current is direct current.

Accordingly, it is an object of the invention to provide a method of purifying waste solutions by an electrochemical process.

A further object is to remove metal ions from waste solutions by electrolytic deposition.

A further object is to remove metal ions from solutions wherein the ions are present in low concentration.

A further object is to provide a method of electrodeposition of metal from solution using pulsed current.

A further object is to provide a method of electrodeposition of metals from waste solutions using a cathode of very high surface area.

A further object is to provide a method for increasing the efficiency of electrolytic reactions in purifying waste solutions.

A further object is to provide a method for electrodeposition of metal ions from waste solutions.

A further object is to provide a method of removing metals from waste solutions by electrolysis using a cathode having a very high surface are which is coated with an ion exchange resin.

Further objects of the invention will become apparent from the description of the invention which follows.

DETAILED DESCRIPTION OF THE INVENTION AND PREFERRED EMBODIMENTS

Figure 1:
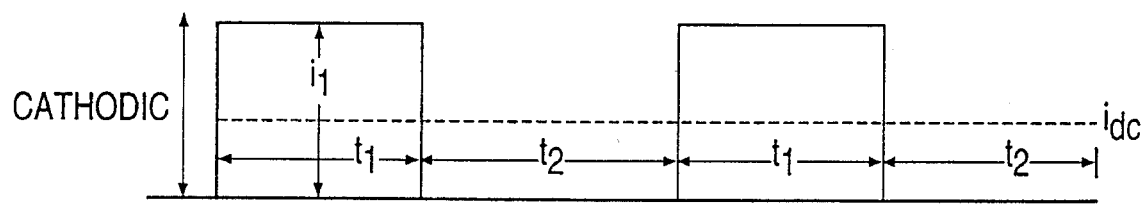
FIG. 1 is a schematic diagram of a pulsed current waveform of the type used in the method of this invention.

According to this invention, the mass transport of an electroactive species, e.g., metal ions from the bulk solution to an electrode, e.g., the cathode, of an electrochemical cell is enhanced by the use of pulsed current (PC) electrolysis instead of DC electrolysis. The effective area of the electrode, i.e., the area of the electrode surface that is active in producing the electrochemical reaction is also increased by using a porous electrode that is permeable to the electrolyte and causing the electrolyte to flow through the porous electrode at a rate that enhances the effective area, as shown by the greater efficiency as compared with higher flow rates. It is believed that the enhanced effective area is the result of operating the cell under conditions wherein the diffusion layer in the electrode is substantially thicker than the roughness of the electrode surface.

The invention will be discussed in the following in terms of plating of metal ions, e.g., copper ions, onto a cathode as the pure metal. However, it will be understood by those skilled in the art that the invention is applicable to any electrode reaction occurring is an electrochemical cell, whether electrooxidation at the anode or electroreduction at the cathode.

The improved efficiency of electrolytic reaction according to the invention can be better understood by reference to certain considerations governing the kinetics of the process. The electrochemical reaction is conducted in a cell which is a particular type of chemical reactor. The equations describing the change in concentration of electrochemically active species are well-known for both batch and continuous processes.

For a batch reactor the following equation governs the concentration of reagent at time t.

$$C_t/C_o = \exp(-k_m At/V_{sol}) \quad (1)$$

where $V_{sol}$ is the solution volume in liters (L), $C_o$ is the initial concentration of reactive species (mol/L), $C_t$ is the concentration of reactive species at time t (mol/L), $K_m$ is the mass transfer coefficient in decimeters per second (dm/s), and A is the electrode surface area in square decimeters (dm$^2$).

For a continuous process two kinds of reactors can be considered. One is a continuous stirred-tank reactor (CSTR), in which the mixing of solution is complete so that the properties (e.g., concentration, temperature) of the reaction mixture are uniform in all parts of the reactor except the electrode surface. Therefore, the properties of the reaction mixture in the reactor are also the same as those in the exit stream. Another is the plug-flow reactor (PFR), in which there is no mixing in the direction of flow and complete mixing perpendicular to the direction of flow. In practice many reactors show intermediate behavior.

For a single-pass continuous process in a CSTR at steady state, the ratio of outlet concentration to inlet concentration of the reactive species can be expressed as:

$$C_{outlet}/C_{inlet} = \frac{1}{1+(k_M A/Q)} \quad (2)$$

For a single pass continuous process in a PFR at steady state, the outlet concentration can be expressed by the following equation:

$$C_{outlet}/C_{inlet} = \exp(-k_m A/Q), \quad (3)$$

where, Q is solution feed rate (L/s).

In all of the above equations it can be seen that an important factor in the rate of the process is $k_m A$ which is the product of the mass transfer coefficient and electrode surface area. When this factor is increased, the terminal concentration for batch cell operation and the outlet concentration for a continuous process will be decreased, i.e., the process becomes more efficient. Therefore, a low terminal concentration can be obtained by increasing the mass transfer rate and/or the electrode surface area.

Consequently, it can be seen that an improvement in electrochemical remediation of waste water can be achieved by enhancing the mass transfer rate and/or electrode surface area, i.e., increasing the factor $k_m A$.

According to the invention the mass transfer rate is increased by using pulsed current in the electrochemical cell and the effective area of the electrode, i.e., the area useful in effecting electrochemical reaction, e.g., deposition of metal, may be increased by using pulsed current electrolysis under certain conditions.

Generally, the increase in mass transfer rate by methods relying on fluid mechanics is mostly due to forced convection in bulk solution, although the thickness of the relatively quiescent diffusion layer adjacent to the electrode may also be reduced by such measures. Even when the relative motion between the electrolyte and the electrode is vigorous, the transport of reactant from the bulk solution to the electrode is limited by its diffusion in the Nernst diffusion layer near the electrode surface. It has now been found that pulsed current (PC) can enhance the mass transfer rate by greatly decreasing the effective diffusion layer thickness.

When a pulsed voltage is imposed on the terminals of an electrochemical cell a corresponding pulsed current through the cell is produced, accordingly, in the following discussion it will be understood that pulsed current and pulsed voltage are generally interchangeable. FIG. 1 illustrates schematically a square wave pulsed current (or voltage) used in the method of the invention. A peak current $i_1$ is turned on for a period of time $t_1$ called the on-time, followed by a zero current for a period of time $t_2$ called the off-time. The sum of on-time and off-time is known as the period of the pulse and the inverse of the period is known as the frequency of the pulse. The percent on-time in a pulse is defined as the duty-cycle (D) of the pulse. The average current is equivalent to a DC current that transports the same amount of charge in the time taken by one cycle ($t_1+t_2$) of the pulsed current and is shown as $i_{dc}$. The current density at the electrode during the on-time is also known as the peak pulse current density and the average current density is defined as the time average of the instantaneous current density over a pulse period. The on-time, off-time and peak pulse current density are additional parameters available in the PC electrolysis process, but not in DC electrolysis.

In DC electrolysis, the cell geometry, electrolyte composition, agitation, and current density are fixed and therefore constrain the mass transport and current distribution. However, when pulsed current is used in electrolysis, the peak voltage of the pulse, the duration and frequency of the pulse and the duty cycle can be varied to influence the mass transfer process and the current distribution, which affects the effective area of the electrode. Unlike the circumstances prevailing in DC electrolysis, the mass transfer characteristics of PC electrolysis are time-dependent processes. PC electrolysis causes concentration fluctuations near the electrode surface and thereby reduces the effective thickness of the Nernst diffusion layer. Consequently, very high limiting current densities can be obtained with PC electrolysis as compared with DC electrolysis.

Figure 2:
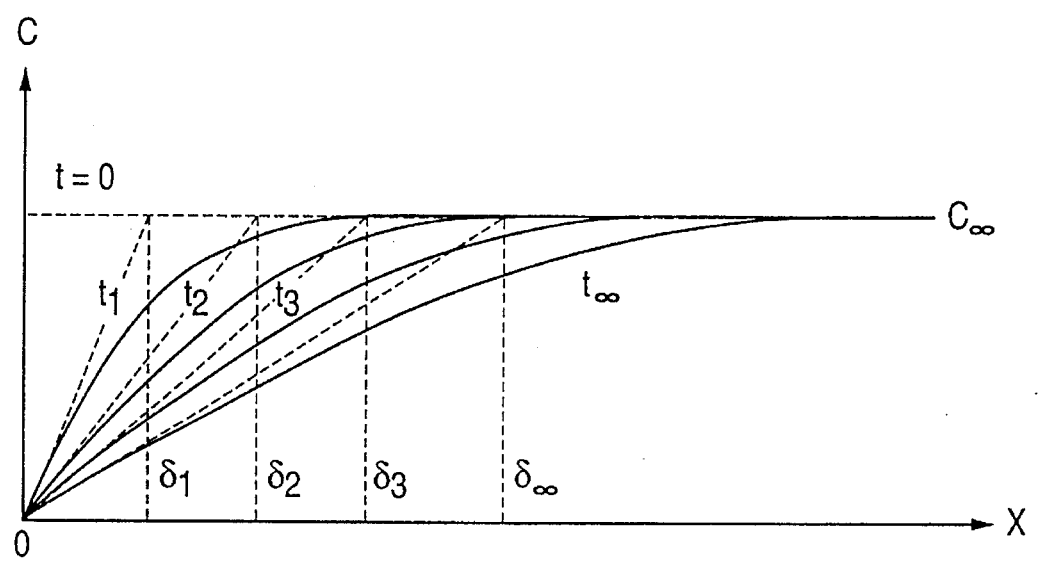
FIG. 2 illustrates the mass transfer near the electrode of an electrolytic cell that is caused by electrolysis of an electroactive species, e.g. by electrodeposition of a metal.

Before an electrical current is applied to an electrochemical cell filled with an electrolyte containing metal ions to-be-deposited on the cathode, the concentration of ions is uniform throughout the electrolyte both in the bulk electrolyte and in the thin quiescent layer adjacent to the cathode surface. FIG. 2 illustrates the concentration changes induced in the layer of solution adjacent to the electrode surface when a pulse of current is imposed. Before the current is turned on, the concentration of the diffusing ion is equal to the bulk concentration $C_\infty$. When a pulse of current is first passed through the electrochemical cell, the metal ions in the solution in contact with the cathode are deposited on the electrode and the concentration of the ions in the adjacent solution decreases. Consequently, a concentration gradient is established near the cathode, and ions accordingly diffuse from the bulk solution region of relatively high concentration toward the depleted region adjacent to the electrode. FIG. 2 shows the profiles of concentration, C, as a function of distance from the electrode surface, X, for different times ($t_1, t_2, t_3, t_\infty$) after the current is turned on. The corresponding thickness of the Nernst diffusion layer, $\delta$, is also shown in the figure for the various time periods after the current is turned on. In steady-state DC electrolysis, $\delta$ is a time-invariant quantity for given electrode geometry and flow rate of electrolyte past the electrode, and is represented by $\delta_\infty$ in FIG. 2. In pulse electrolysis, however, $\delta$ varies from zero at the beginning of a pulse to a value of $\delta_\infty$ when the steady-state Nernst diffusion layer is fully established. The corresponding diffusion current density is very large at t=0 and decreases to the steady-state value of the DC limiting current density at $t=t_\infty$. PC electrolysis enjoys the advantage that the current can be interrupted (e.g., at $t=t_2$) before $\delta$ reaches the steady-state value. When the potential is first imposed, the current is relatively large because the depleted layer is thin and the time required for the ions closest to the electrode to diffuse to the electrode surface is relatively small, which results in a relatively large transfer of charge per unit time. As the electrolysis proceeds, the thickness of the depleted layer increases until, under conditions of DC electrolysis, a steady-state concentration gradient is established and the thickness of the diffusion layer becomes constant. The thickness of the Nernst diffusion layer is related to this layer of concentration gradient adjacent to the electrode. Because the rate at which the metal ions can be supplied to the electrode by diffusion through the relatively thick steady-state depleted layer is evidently less than the rate possible when the diffusion layer is thin, the current density is limited. Accordingly, the thick steady-state diffusion layer produced by DC electrolysis effectively limits the rate of metal deposition and increases the overpotential.

However, if the current is pulsed using a pulse duration that is significantly shorter than the time required for the establishment of a thick diffusion layer adjacent to the electrode, the current during the pulse will be relatively large. After the pulse is terminated, the concentration of ions adjacent to the electrode surface is replenished by natural diffusion before the next pulse is imposed. Consequently, when the next pulse arrives, the conditions are identical to those of the previous pulse, and the current is again relatively large. Accordingly, for the same average current, i.e., total transfer of charge over a period of time, the effective current used to move ions from the bulk solution to the electrode surface is greater for PC than for DC. Consequently, the effective thickness of the Nernst diffusion layer is thinner for PC electrolysis than for DC electrolysis. Therefore, the efficiency of PC electrolysis will be greater than that of DC, at least under conditions where the concentration gradient in the diffusion layer is a significant factor in determining the limiting current.

Because of the increased mass transport rate attributable to the use of PC electrolysis, the factor $k_m$ in equations (1)–(3) above is increased and the efficiency of the electrolysis is expected to be increased as well.

The use of PC in conducting electrochemical reactions is also believed to increase the effective area of the electrode available for electrochemical reaction, e.g., metal deposition, at least under certain conditions. That is, the factor A, representing the effective surface area of the electrode in equations (1)–(3) discussed above may be increased by PC electrolysis. While not wishing to be bound by theory, it is believed that the effect of PC on the effective surface area are related to the relative thickness of the Nernst diffusion layer with respect to the surface roughness of the electrode.

Figure 3A:
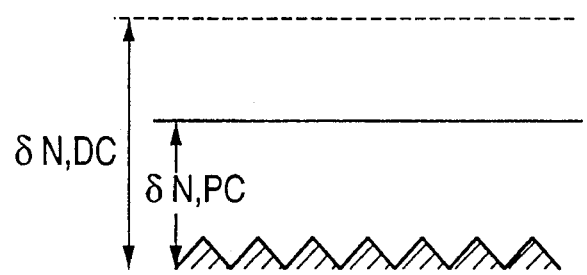
FIG. 3a illustrates the relation between the concentration diffusion layer for DC and PC produced by electrolysis at an electrode wherein the roughness of the surface is small compared with the thickness of the diffusion layer.
Figure 3B:
FIG. 3b illustrates the relation between the concentration diffusion layer for DC and PC produced by electrolysis at an electrode wherein the roughness of the surface is large compared with the thickness of the diffusion layer.

The difference between the relative thickness of the Nernst diffusion layer for electrodes having small surface roughness and those having a relatively large surface roughness is illustrated in FIGS. 3A and 3B. Generally an electrode having a large surface roughness is one in which the surface asperities have dimensions of the order of a few millimeters or greater (a "macrorough" electrode), while an electrode having a small surface roughness has surface asperities having dimensions substantially smaller than one millimeter (a "microrough" electrode). Because the influence of electroplating conditions on the distribution of deposited metal over an irregular surface is often described in terms of the "throwing power" of the electrolyte or electrolysis conditions, the effect of PC or DC on the distribution of metal deposition on a macrorough electrode is sometimes described in terms of "macrothrowing power" while the effects observed for microrough electrodes are described as "microthrowing power".

It is evident from the above discussion that the thickness of the Nernst diffusion layer can be influenced by the degree of agitation of the electrolyte. Vigorous agitation or high flow rate of electrolyte past the electrode surface tends to produce a relatively thin Nernst diffusion layer, while less vigorous agitation and slower electrolyte flow rates tend to produce a thick Nernst diffusion layer. Under the ordinary conditions of DC electrolysis, a thinner Nernst diffusion layer is desirable because it increases the mass transfer rate, and accordingly it is conventional practice in DC electrolysis to use the greatest agitation of the electrolyte that is economically practical, e.g., to pump electrolyte through a flow type electrolysis cell as fast as is economical considering the expense of pumps and the energy to run them. Under such conditions of DC electrolysis the agitation of the electrolyte, which may increase the factor $k_m$ has essentially no effect on the effective electrode area, i.e., on the factor A. However, when PC electrolysis is used to enhance the mass transport (i.e., $k_m$) the effect of PC on the effective electrode area (A) must also be considered.

FIG. 3A illustrates the relative thickness of the Nernst diffusion layer adjacent to a microrough electrode for DC and PC electrolysis, other conditions being equal. It can be seen that the thickness of the Nernst diffusion layers for DC electrolysis, $\delta_{N,DC}$, and for PC electrolysis, $\delta_{N,PC}$, are both somewhat greater than the surface roughness, but that the thickness of the diffusion layer is less for PC than for DC. Under these conditions, metal ions may have more opportunity to diffuse to recesses in the surface when PC is used than when DC is used, while DC electrolysis favors metal deposition only on the peaks of the asperities. Consequently under these conditions PC uses an effectively greater portion of the surface area and the factor A in equations (1)–(3) is increased. Accordingly under these conditions, use of PC can enhance the efficiency of the electrolysis process.

FIG. 3B illustrates the relative thickness of the Nernst diffusion layer adjacent to a macrorough electrode for DC and PC electrolysis, other conditions being equal. It can be seen that, although the thickness of the Nernst diffusion layer for PC is again somewhat less than for DC, the change in thickness is the same for both the peaks and valleys of the electrode surface asperities. Consequently, under these conditions, the use of PC is expected to have little effect on the distribution of the metal ions over the electrode surface, i.e., the effective electrode area for PC would be no greater than that for DC. Furthermore, because PC uniformly decreases the polarization resistance due to the ion-depleted layer adjacent to the electrode, the current distribution under PC conditions would be expected to favor the peaks of the electrode surface asperities. Consequently, under such conditions, the use of PC might actually decrease the effective area A of the electrode.

It is according to the invention to operate an electrolytic cell, e.g., a cell for removing metals from waste solutions, under conditions wherein the use of PC provides an increase in the efficiency of the electrolysis with respect to DC. The frequency of the pulses should be low enough and the duty cycle should be great enough to complete the two-step copper reductionprocess, i.e., reduction of copper (II) to copper (I) and reduction of copper (I) to metallic copper. Moreover, the frequency should be high enough and the duty cycle should be low enough to enhance the mass transfer rate. One skilled in the art, instructed by the above discussion, will have no difficulty in determining the best balance of pulse frequency, pulse width and duty cycle. for a given process and electrolytic cell. In most practical cases, the pulse frequency will range from 0.5 Hz to 1000 Hz and the duty cycle will not exceed 50%. Preferably the pulse frequency will be between about 10 Hz and 100 Hz, and the duty cycle will be between 10% and 50%.

In order to provide a microrough electrode which favors the use of PC electrolysis, as explained above, it is advantageous to use electrodes having as high a surface area as practically possible. Although such high surface area electrodes can be prepared from large plates or plates arranged in arrays, e.g., closely spaced arrays, high surface area electrodes useful in the process of the invention are typically prepared from a porous material or by means of packed bed of conductive particles. Such electrodes are sometimes referred as "fuel cell type electrodes" because they are frequently used in such cells. Such high surface area fuel cell type electrodes offer the potential for roughness factors of up to 10,000 or more, i.e., the ratio of total surface area of the porous electrode to the projected or geometric area presented to the cell. Such fuel cell electrodes may comprise, for example, a noble metal catalyst supported on a high specific surface area carbon (750 $m^2/g$). The carbon/catalyst composite is bonded into a massive electrode by a fluorocarbon polymer matrix, e.g., polytetrafluoroethylene or fluorinated ethylene-propylene copolymer, and pressed onto a current collector made from a carbon fiber paper material. The content of fluorinated polymer and the processing temperature are adjusted to achieve optimum balance between liquid wetting and gas intrusion. The manufacture of such electrodes is known to those skilled in the art and is discussed, for example, in Giordano, N., et al., *Electrochimica Acta* 35 (9), p. 1411 (1990).

For removing metals from waste solutions, a similar electrode can be prepared using carbon containing no catalyst and adjusting the content of fluorinated polymer and processing temperature to achieve maximum wettability of the carbon cathode with the waste solution containing a low concentration of metal ion. Typically such a high surface area cathode will contain about 5 $mg/cm^2$ of material resulting in about 40,000 $cm^2$ of carbon per $cm^2$ of electrode. Based on experience with conventional gas diffusion electrodes, about 25% of the electrode would be expected to be wet by the electrolyte, resulting in an effective roughness factor of about 10,000. Such an electrode can be considered to be an ultra-high surface area electrode, and would be expected to act as a microrough electrode because the packed particles are very small, and the electrode can be operated under conditions wherein the particle size is very small compared to the thickness of the Nernst diffusion layer. Packed-bed electrodes useful in practicing the method of the invention can be prepared using carbon particles having an average diameter of about 1 mm. Such electrodes can also be prepared using carbon particles having a specific surface area of at leat 80 $m^2/g$, preferably at least 750 $m^2/g$. In some cases carbon particles having a specific surface area of not less than about 1500 $m^2/g$ may be used in preparing packed-bed electrodes for use in the process of the invention. When PC electrolysis is used in conjunction with such high surface are electrodes, the factor $k_m A$ is greatly increased due to the enhanced mass transfer rate and the relatively great proportion of the electrode surface area that is utilized.

A further enhancement of the mass transfer rate is possible with such high surface are electrodes by employing a coating of an ion exchange resin on the electrode particles. Any ion exchange resin capable of binding metal ions is usable to coat the electrode. A suitable coated electrode for use in the method of the invention is a high surface area electrode, e.g., a packed bed of carbon particles, wherein the particles have been coated with a thin layer of a perfluorinated sulfonic acid ionomer such as that sold by E. I. du Pont de Nemours & Co. under the trade name Nafion®. The carbon to be made into the electrode is coated by the conventional process of immersing the carbon particles in a solution of such an ion exchange resin in a suitable solvent and then removing them from the solution and allowing the coated particles to dry. The carbon particles can then be made into a high surface area electrode by conventional procedures as described above. The presence of a layer of ion exchange resin on the surface of the electrode provides a method of enhancing the concentration of electroactive species, e.g., metal ions, adjacent to the electrode surface and thereby increasing the mass transfer rate.

The practice of the invention is illustrated by the following examples which are intended to be illustrative only and do not limit the scope of the invention in any way. In the examples comparative experiments were conducted to recover copper from an acid copper sulfate solution using PC electrolysis, with DC electrolysis as a baseline.

Figure 4:
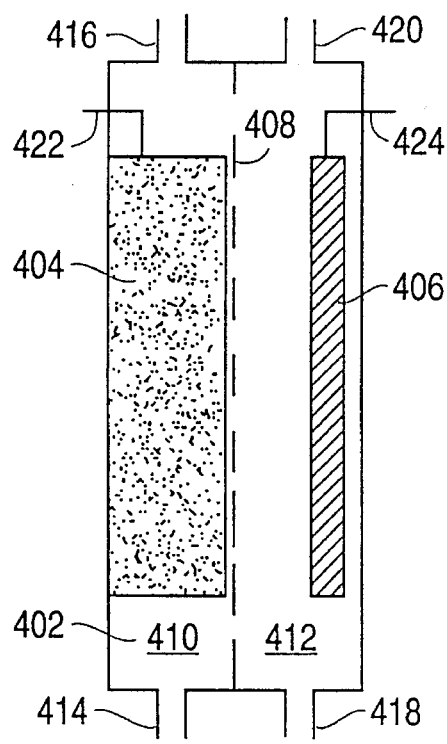
FIG. 4 illustrates one module of an electrolytic apparatus used in the experimental investigations reported in the Examples.

The experimental apparatus comprised an electrolytic cell as illustrated in FIG. 4 and associated tanks and pumps for circulating electrolyte and an electrical power supply together with metering equipment to monitor and record current and voltage.

The cell comprised three cell modules of the type illustrated schematically in FIG. 4. Each module comprised an enclosure 402 containing a cathode 404, an anode 406 and a membrane 408 that divided the module onto a cathode compartment 410 and an anode compartment 412. The membrane was positioned as close as possible to the packed-bed cathode 404, and the anode 406 was spaced about 2.5 mm from the membrane. The membrane was made of fluorinated ionomeric polymer, Nafion®450, sold by E. I du Pont de Nemours & Co. A catholyte inlet 414 and a catholyte outlet 416 are provided for cirulating the catholyte from a catholyte tank not shown through the cathode compartment 410 and back to the catholyte tank. Similarly, an anolyte inlet 418 and an anolyte outlet 420 are provided for cirulating the anolyte from an anolyte tank, not shown, through the anode compartment 412 and back to the anolyte tank. A cathode terminal 422 and an anode terminal 424 are provided for supplying the electrolysis current to the cell and were connected to sources of pulsed or direct current as appropriate for the experimental conditions under investigation. The cathode 404 was a packed-bed cathode which was packed with irregular graphite particles having an equivalent diameter of 1–2 mm. The void fraction was about 0.5. The cathode had a vertical height of 25 cm, a width of 16 cm and the thickness of the packed bed was 9 mm. Catholyte entered the bottom of the cell through inlet 414, flowed through the cathode in an upward direction, and exited the cell at outlet 416 at the top of the cell. The anode 406 was a specially constructed metal mesh anode coated with a titanium-ruthenium oxide coating to provide low oxygen overvoltage and generally known in the art as a dimensionally stable anode (sold, for example, by Diamond Shamrock, S. A. under the trademark DSA). The experiments were conducted in a batchwise recirculation mode. Catholyte and anolyte were recirculated between their respective holding tanks and the cathode or anode compartments of the electrochemical cell at a preselected flow rate. During the experiment, the pH and temperature of the catholyte and anolyte were measured and the cathode-to-anode voltage was monitored with a voltmeter.

To examine the effect of pulsed current (PC) on copper recovery process, PC with varied frequencies, duty cycles and peak currents were used in the tests at three different solution flow rates of 0.5 liters/minute, 2.5 L/min and 6 L/min, and the results were compared to DC electrolysis at the same average cell current. From experimental results, it was found that PC had a different effect at different solution flow rates.

EXAMPLE 1

This example compares PC and DC electrolysis of waste copper solutions at a flow rate of 0.5 L/min in the test apparatus.

At a solution flow rate of 0.5 L/min, experiments were conducted at DC of 10 A and 20 A, and PC of average current of 10 A with various frequencies and duty cycles. A 24 liter synthesized copper waste solution (catholyte) containing about 0.003M $CuSO_4$ (or about 200 ppm copper ion) and 0.01M $H_2SO_4$ was used in the tests. The anolyte was 0.01M $H_2SO_4$. During the experiment the catholyte/anolyte temperatures varied from 70° to 74° F. (22.8° C. to 32.9° C.) and the pH of both electrolytes was about 2.2.

Figure 5:
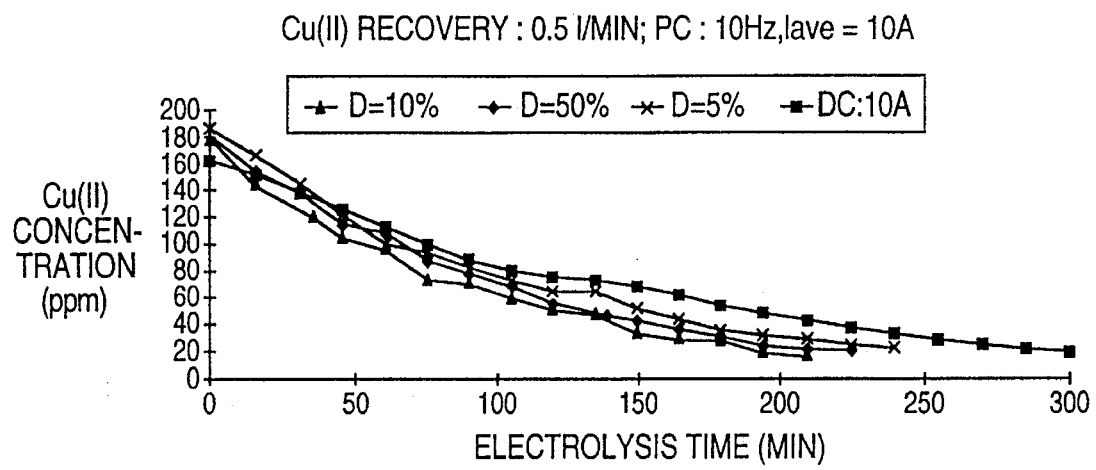
FIG. 5 illustrates the concentration of copper (II) ions as a function of time for PC and DC using a porous permeable electrode wherein the flow rate of electrolyte through the electrode is low enough to provide a diffusion layer that is relatively thick compared to the surface roughness of the electrode, as found in the experiment of Example 1.
Figure 6:
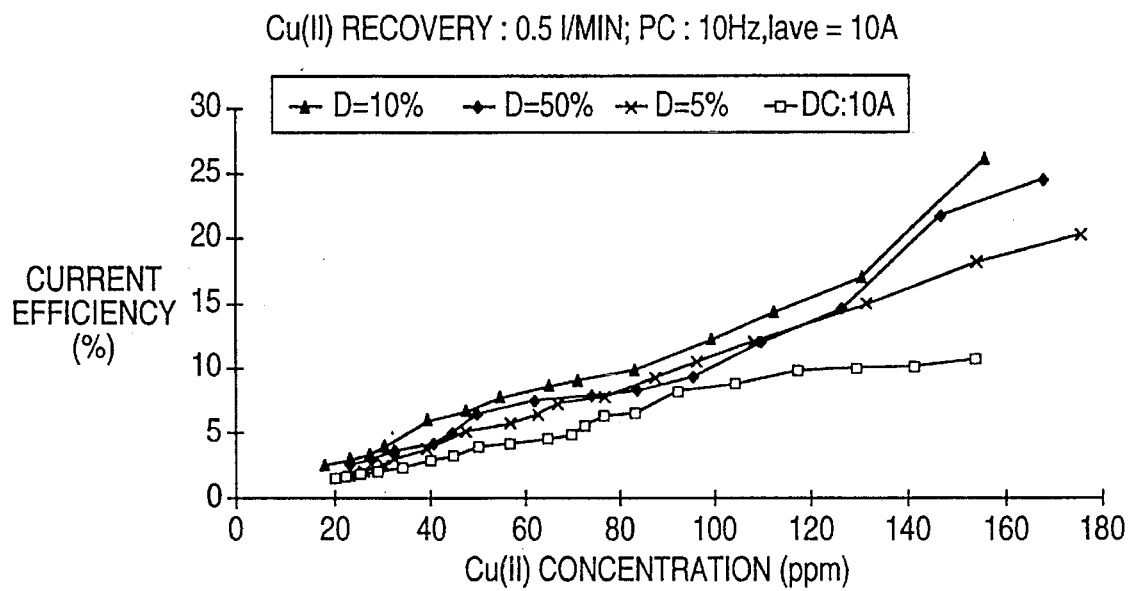
FIG. 6 illustrates the cathodic current efficiency as a function of the copper (II) ion concentration for the experiments plotted in FIG. 5.
Figure 7:
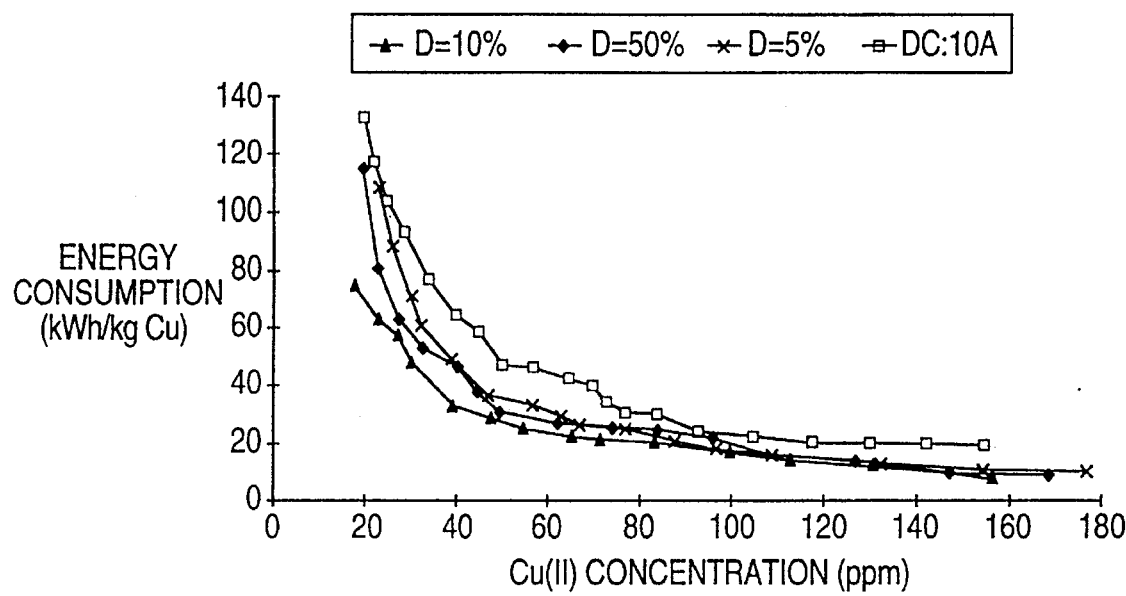
FIG. 7 illustrates the electric energy consumption as a function of the copper (II) ion concentration for the experiments potted in FIG. 5.

FIG. 5 shows the change in copper ion concentration with electrolysis time for a DC test of 10 A and several PC tests having an average cell current ($I_{ave}$) of 10 A, a frequency of 10 Hz and different duty cycles (D). A comparison of the plots in the figure shows that all of the PC runs took less time to deplete the copper ion concentration in the catholyte from about 200 ppm to 1 ppm. FIGS. 6 and 7 show the instantaneous cathodic current efficiency and electrical energy consumption, respectively, per kilogram of copper recovered vs. copper concentration for these runs. As shown in the figures, current efficiency was higher and energy consumption was lower for all PC electrolysis compared to DC electrolysis.

Figure 8:
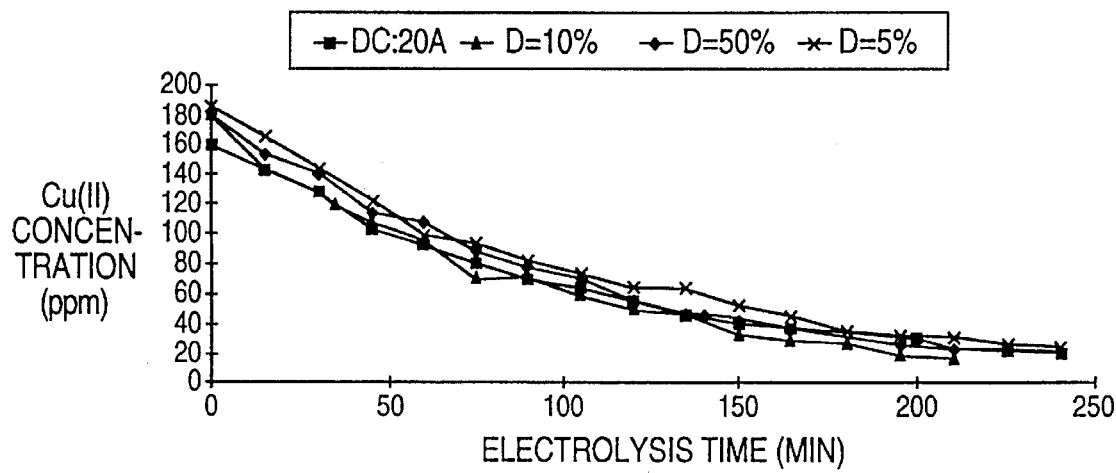
FIG. 8 illustrates additional data for the concentration of copper (II) ions as a function of time for PC and DC under the flow conditions of Example 1 using varied conditions of electrolysis current.
Figure 9:
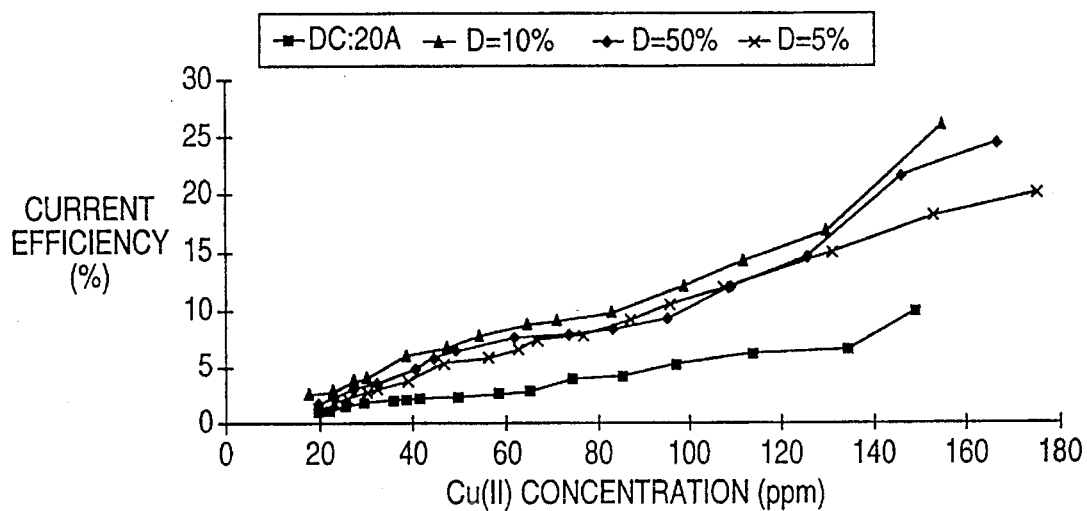
FIG. 9 illustrates the cathodic current efficiency as a function of the copper (II) ion concentration for the experiments plotted in FIG. 8.
Figure 10:
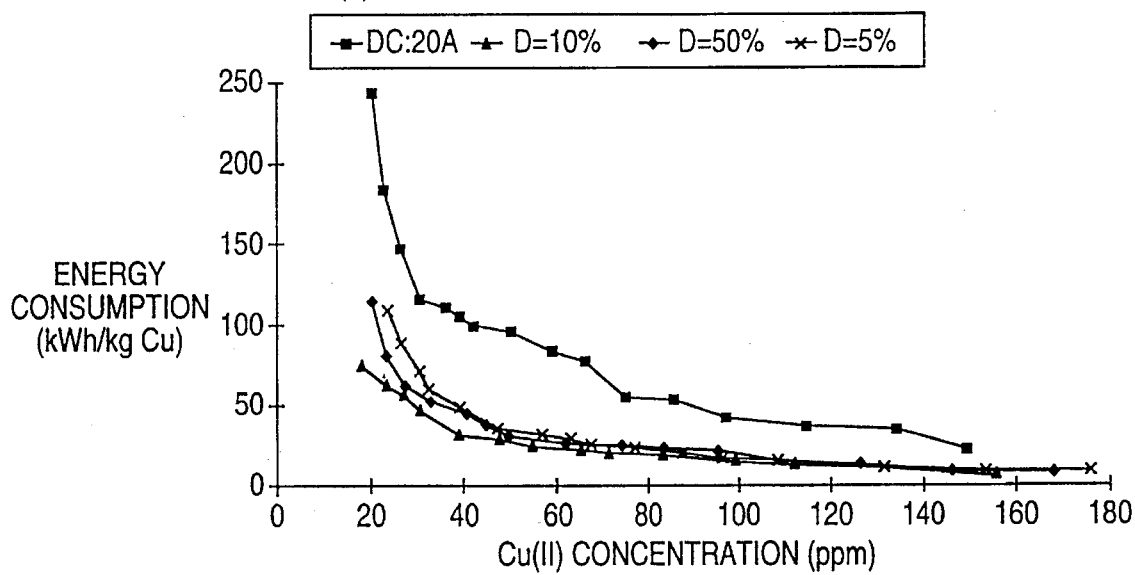
FIG. 10 illustrates the electric energy consumption as a function of the copper (II) ion concentration for the experiments plotted in FIG. 8.

Further results for tests using the same test cell operated at a catholyte and anolyte flow rate of 0.5 L/min are shown in FIGS. 8, 9 and 10. FIG. 8 shows the copper concentration change with electrolysis time for a DC test at 20 A and several PC tests with an average cell current of 10 A. It can be seen that it took almost the same time for DC at 20 A and all PC runs with an average current of 10 A to decrease copper concentration from 200 ppm to 1 ppm. However, due to the high cathode-to-anode voltage at DC 20 A, the energy consumption per kilogram of copper recovered was much higher for DC 20 A than for the PC runs. FIGS. 9 and 10 show the instantaneous cathodic current efficiency and electrical energy consumption, respectively, per kilogram of copper recovered vs. copper concentration for these runs. As shown in the figures, current efficiency was much higher and energy consumption was much lower for all PC electrolysis compared to DC electrolysis. Table 1 below summarizes the average current efficiency and energy consumption per kilogram of copper recovered for DC of 10 A and 20 A, and PC runs with an average current of 10 A. The average current efficiency and energy consumption are based on a copper concentration of 200 ppm to 20 ppm. As shown in the table, the average current efficiency was higher and energy consumption per kilogram of copper recovered was lower for all of these PC runs compared to both DC 10 A and 20 A. The results indicate that PC was better compared to DC for copper recovery from an acid copper sulfate solution at a solution flow rate of 0.5 L/min in the copper concentration range of 1–200 ppm. The column headings for the PC runs give the average current (A), the frequency (Hz) and the duty cycle (%).

TABLE 1

Results of copper recovery from an acid copper sulfate solution at a flow rate of 0.5 L/min

|  | DC:20A | DC:10A | PC:10A 10 Hz D = 10% | PC:10A 10 Hz D = 50% | PC:10A 10 Hz D = 5% | PC:10A 100 Hz D = 10% | PC:10A 1000 Hz D = 10% |
| --- | --- | --- | --- | --- | --- | --- | --- |
| Initial Cu (ppm) | 158 | 161 | 180 | 183.3 | 185.7 | 152 | 176.9 |
| Final Cu (ppm) | 19 | 19 | 15.9 | 19.4 | 21.2 | 19 | 19 |
| Time (min) | 240 | 300 | 210 | 225 | 240 | 180 | 240 |
| Total Charge (C) | 288000 | 180000 | 126000 | 135000 | 144000 | 108000 | 144000 |
| Average Cell Voltage (V) | 2.6 | 2.2 | 2.2 | 2.2 | 2.2 | 2.2 | 2.2 |
| Average Current Efficiency (%) | 3.5 | 5.7 | 10 | 8.8 | 8.3 | 9 | 9 |

TABLE 1-continued

Results of copper recovery from an acid copper sulfate solution at a flow rate of 0.5 L/min

|  | DC:20A | DC:10A | PC:10A 10 Hz D = 10% | PC:10A 10 Hz D = 50% | PC:10A 10 Hz D = 5% | PC:10A 100 Hz D = 10% | PC:10A 1000 Hz D = 10% |
|---|---|---|---|---|---|---|---|
| Average Energy Consumption (kWh/kg Cu) | 62.7 | 32.6 | 18.6 | 21.1 | 22.3 | 20.6 | 23.2 |

EXAMPLE 2

This example compares PC and DC electrolysis of waste copper solutions at a flow rate of 2.5 L/min in the test apparatus.

At a solution flow rate of 2.5 L/min, experiments were conducted at DC of 20 A, and PC of average current of 20 A with various frequencies and duty cycles. A 24 liter synthesized copper waste solution (catholyte) containing about 0.012M $CuSO_4$ (or about 800 ppm copper ion) and 0.01M $H_2SO_4$ was used in the tests. The anolyte was 0.01M $H_2SO_4$. During the experiment the catholyte/anolyte temperatures varied from 70° to 74° F. (22.8° C. to 32.9° C.) and the pH of both electrolytes was about 2.2.

Figure 11:
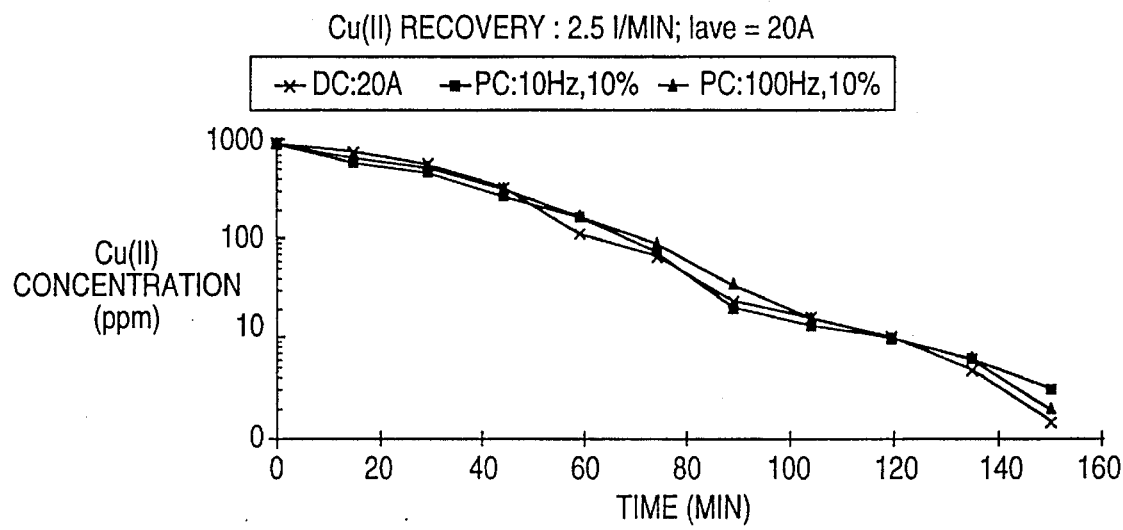
FIG. 11 illustrates the concentration of copper (II) ions as a function of time for PC and DC using a porous permeable electrode wherein the flow rate of electrolyte through the electrode is somewhat higher than that which produces a diffusion layer that is relatively thick compared to the surface roughness of the electrode, as found in the experiment of Example 2.

FIG. 11 shows the change in copper ion concentration with electrolysis time for a DC test of 20 A and several PC tests having an average cell current of 20 A. A comparison of the plots in the figure shows that it took almost the same length of time for DC and all of the PC runs to deplete the copper ion concentration in the catholyte from about 800 ppm to 1 ppm. The average cathode-to-anode voltages for DC of 20 A and PC of average current of 20 A are almost the same. The current efficiency and energy consumption per kilogram of copper recovered for both cases at 2.5 L/min are also comparable. These results indicated that PC had no improvement compared to DC for copper recovery from an acid copper sulfate solution at a solution flow rate of 2.5 L/min in the test apparatus.

EXAMPLE 3

This example compares PC and DC electrolysis of waste copper solutions at a flow rate of 6 L/min in the test apparatus.

At a solution flow rate of 6 L/min, experiments were conducted at DC of 20 A, and PC of average current of 20 A with various frequencies and duty cycles. A 24 liter synthesized copper waste solution (catholyte) containing about 0.012M $CuSO_4$ (or about 800 ppm copper ion) and 0.01M $H_2SO_4$ was used in the tests. The anolyte was 0.01M $H_2SO_4$. During the experiment the catholyte/anolyte temperatures varied from 70° to 74° F. (22.8° C. to 32.9° C.) and the pH of both electrolytes was about 2.2.

Figure 12:
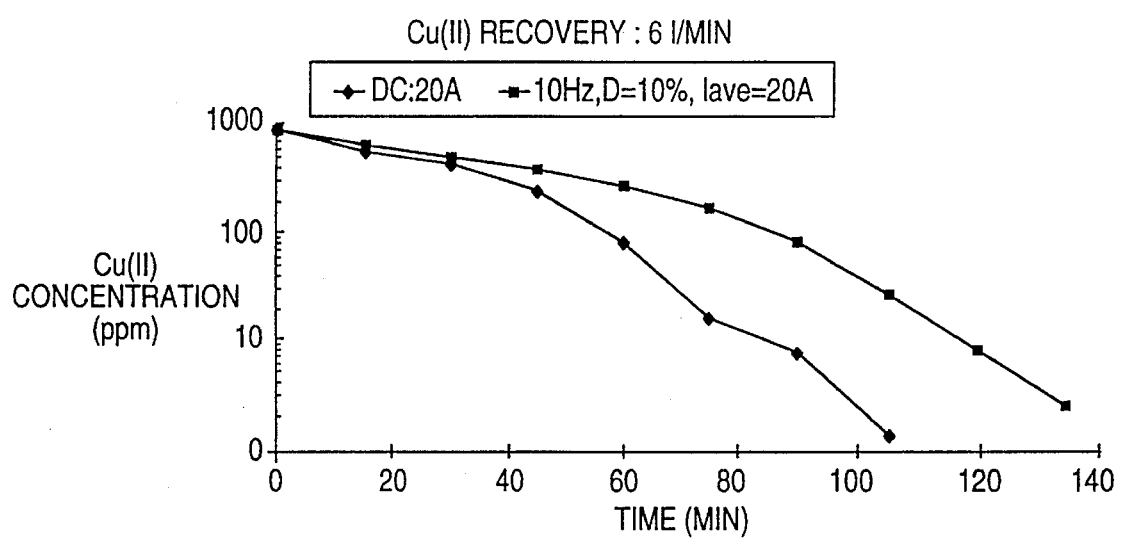
FIG. 12 illustrates the concentration of copper (II) ions as a function of time for PC and DC using a porous permeable electrode wherein the flow rate of electrolyte through the electrode is substantially higher than that which produces a diffusion layer that is relatively thick compared to the surface roughness of the electrode, as found in the experiment of Example 3.

FIG. 12 shows the change in copper ion concentration with electrolysis time for a DC test of 20 A and several PC tests having an average cell current of 20 A. A comparison of the plots in the figure shows that it took less time for DC than for PC to decrease the copper ion concentration in the catholyte from about 800 ppm to 1 ppm. The average cathode-to-anode voltages for DC of 20 A and PC of average current of 20 A are almost the same. The current efficiency was higher and energy consumption per kilogram of copper recovered was lower for DC than for PC at 6 L/min solution flow rate. These results indicated that DC was better than PC for copper recovery from an acid copper sulfate solution at a solution flow rate of 6 L/min in the test apparatus.

EXAMPLE 4

This example compares the efficiency of copper recovery for PC and DC under the best conditions for each mode in the experimental cell.

Figure 13:
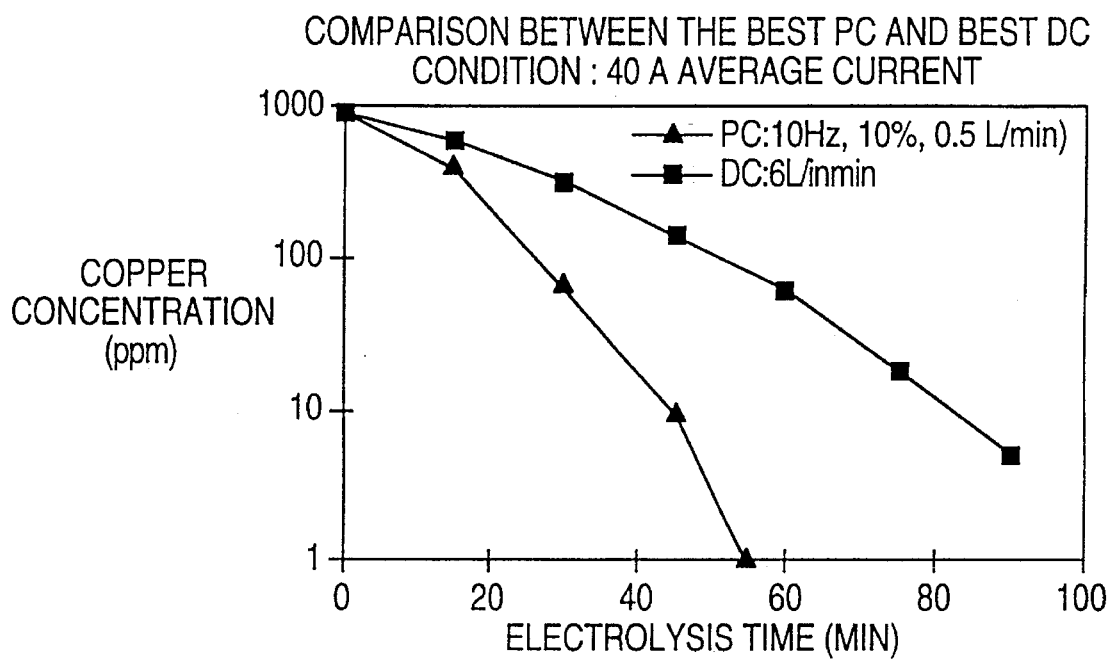
FIG. 13 shows a comparison of the rate of removal of metal ions from a solution for PC and DC at an average current of 40 A for the best conditions for each mode in the experiments of Example 4.
Figure 14:
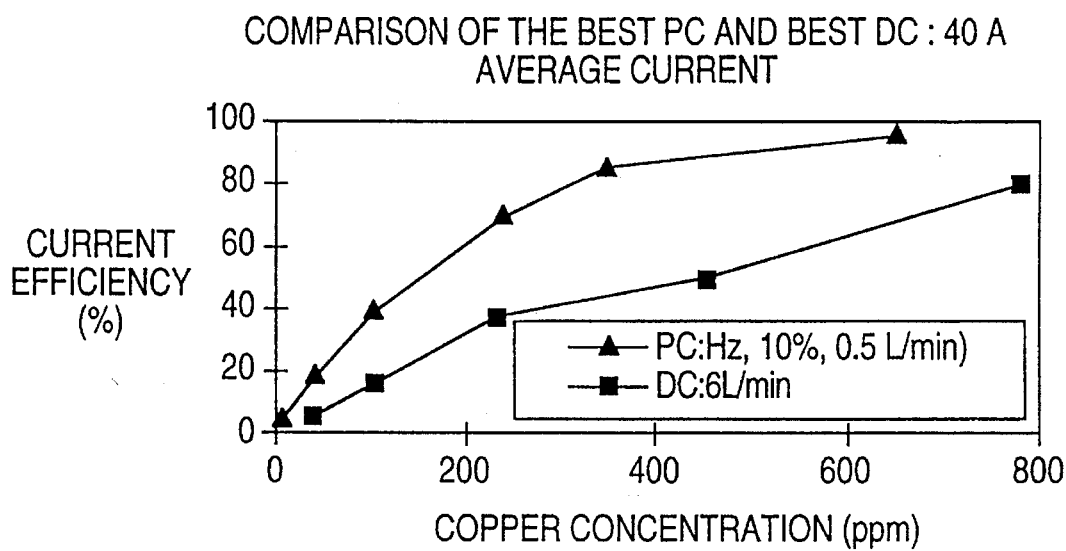
FIG. 14 shows a comparison of the current efficiency for the PC and DC electrolyses in the experiments of Example 4.

Copper solutions containing 1000 ppm of CU (II) were prepared and electrolyzed by the general procedure of Example 1 using the test electrolysis cell described above with an average current of 40 A for PC and a steady current of 40 A for DC. Five different flow rates were tested, 0.5 L/min, 2.5 L/min 6 L/min, 8.5 L/min and 10 L/min. The most efficient conditions for metal removal using DC electrolysis were found at an electrolyte flow rate of 6 L/min. The most efficient conditions for metal removal using PC were found to be an electrolyte flow rate of 0.5 L/min, a frequency of 10 Hz and a duty cycle of 10%. FIG. 13 compares the rate of removal of metal ions from the solution for PC and DC at an average current of 40 A for the best conditions for each mode. The results show that even at a flow rate of 0.5 L/min the PC electrolysis reduces the concentration of the solution substantially faster than DC electrolysis and reaches lower ultimate concentrations in a substantially shorter time. The PC electrolysis was able to reduce the metal ion concentration to 1 ppm in less than 60 min, while the DC electrolysis reached only about 6–7 ppm and took 90 min to reach that value. FIG. 14 compares the current efficiency for the PC and DC processes in the experiments of this example. FIG. 14 shows that the current efficiency for PC at its best conditions (0.5 L/min flow rate, 40 A average current, 10 Hz frequency, and 10% duty cycle) is substantially greater than the current efficiency of DC electrolysis at its best conditions (6 L/min flow rate, 40 A average current) for all concentrations of copper in the electrolyte solution.

Table 2 below gives the numerical values of the current efficiency for PC and DC in the experiments of this example averaged over different concentration ranges. The comparison illustrates the substantially improved efficiency that can be obtained by using PC. The comparisons at lower concentrations are limited because the DC electrolysis did not achieve concentrations substantially lower than 10 ppm in a reasonable experimental duration. Nevertheless the results demonstrate the great advantage that can be obtained by use of PC especially for waste solutions containing low concentrations of metal ions.

TABLE 2

Current Efficiency for Pulsed Current and Direct Current Electrowinning under Best Conditions at 40 A Average Current

| Concentration Range (ppm) | Current Efficiency (%) | |
|---|---|---|
| | Pulsed Current (0.5 L/min, 10 Hz duty cycle 10%) | Direct current (6 L/min) |
| 1000–500 | 95 | 80 |
| 1000–200 | 85 | 50 |
| 1000–100 | 80 | 40 |
| 1000–50 | 70 | 35 |
| 1000–10 | 60 | 20 |
| 1000–1 | 55 | |
| 500–10 | | 15 |
| 500–1 | 50 | |
| 200–10 | | 10 |
| 200–1 | 40 | |
| 100–10 | | 8 |
| 100–1 | 25 | |
| 50–10 | | 5 |
| 50–1 | 20 | |

The results of this example, as illustrated in FIGS. 13 and 14 and in Table 2, demonstrate that PC electrolysis can provide very significant advantages in the electroremediation of waste solutions containing metal ions as compared with DC electrolysis.

The results of the experiments described above illustrate that it is possible to achieve an increased efficiency of the electroplating process in removing metals from waste solutions to the very low levels required by current regulations governing release of waste solutions to the environment. The results show that this increased efficiency is obtained by operating the electrochemical cell using PC electrolysis and restricting the flow rate of electrolyte through the electrode so that the electrode is operating under microrough conditions. Such improved efficiency can, of course, result in a lowered expenditure of energy for purifying waste solutions by electrolysis. The improved efficiency can also allow the use of smaller and less expensive electrolytic cells with the accompanying substantial decrease in capital expenditure for pollution control equipment in those industries which must remediate their metal-containing waste solutions to very low levels of contaminants.

The invention having now been fully described, it should be understood that it may be embodied in other specific forms or variations without departing from its spirit or essential characteristics. Accordingly, the embodiments described above are to be considered in all respects as illustrative and not restrictive, the scope of the invention being indicated by the appended claims rather than the foregoing description, and all changes which come within the meaning and range of equivalency of the claims are intended to be embraced therein.

We claim:

1. A method for producing an electrochemical reaction at an electrode in contact with a solution of an electroactive species comprising introducing an electrolyte containing an electroactive species into an electrolytic cell having a cathode and an anode, producing a flow of said electrolyte past at least one of said cathode or said anode at an electrolyte flow rate, passing an electric current through said solution between said anode and said cathode whereby said electroactive species undergoes an electrochemical reaction at one of said cathode or said anode at an electrochemical reaction rate, wherein said electric current is a pulsed current pulsed at a frequency of about 0.5 to about 1000 Hertz and having a duty cycle of not greater than about 50%, and adjusting said electrolyte flow rate that said electrochemical reaction rate when said current is pulsed current is greater than said electrochemical reaction rate to maintain microthrowing power effect wherein $k_m A$ for electrolysis using said pulsed current exceeds said $k_m A$ for electrolysis using direct current.

2. The method of claim 1 wherein said pulsed current electrolyte flow rate is less than an electrolyte flow rate which produces the same electrochemical reaction rate when said electric current is direct current.

3. The method of claim 1 wherein said cathode is a high surface area electrode.

4. The method of claim 1 wherein said cathode is a packed-bed electrode.

5. The method of claim 4 wherein said cathode is a packed bed electrode containing carbon particles of average diameter no greater than about 1 millimeter.

6. The method of claim 4 wherein said cathode is a packed bed electrode containing carbon particles having a specific surface area of at least about 80 m²/g.

7. The method of claim 4 wherein said cathode is a packed-bed cathode containing carbon particles having a specific surface area of at least about 750 m²/g.

8. The method of claim 4 wherein said cathode is a packed-bed cathode containing carbon particles having a specific surface area of at least about 1500 m²/g.

9. The method of claim 1 wherein said electrode has a roughness factor of at least about 10,000.

10. The method of claim 1 wherein said frequency is from about 10 Hz to about 100 Hz.

11. The method of claim 1 wherein said duty cycle is from about 10% to about 50%.

12. The method of claim 1 wherein said frequency is from about 10 Hz to about 100 Hz and said duty cycle is from about 10% to about 50%.

13. A method for removing metal ions from waste solutions by electrolytic deposition comprising introducing an electrolyte containing ions of a metal into an electrolytic cell having a cathode and an anode, producing a flow of said electrolyte past at least one of said cathode or said anode at an electrolyte flow rate, passing an electric current through said solution between said anode and said cathode whereby said ions are deposited as elemental metal on said cathode at an electrodeposition rate, wherein said electric current is pulsed current pulsed at a frequency of about 0.5 to about 1000 Hertz and a duty cycle of not greater than about 50%, and adjusting said electrolyte flow rate to maintain microthrowing power effect wherein $k_m A$ for electrolysis using said pulsed current exceeds said $k_m A$ for electrolysis using direct current.

14. The method of claim 13 wherein said pulsed current electrolyte flow rate is less than an electrolyte flow rate which produces the same electrodeposition rate when said electric current is direct current.

15. The method of claim 13 wherein said cathode is a high surface area electrode.

16. The method of claim 15 wherein said cathode is a packed-bed cathode.

17. The method of claim 15 wherein said cathode is a packed bed electrode containing carbon particles of average diameter no greater than about 1 millimeter.

18. The method of claim 15 wherein said cathode is a packed bed electrode containing carbon particles having a specific surface area of at least about 80 $m^2/g$.

19. The method of claim 15 wherein said cathode is a packed-bed cathode containing carbon particles having a specific surface area of at least about 750 $m^2/g$.

20. The method of claim 15 wherein said cathode is a packed-bed cathode containing carbon particles having a specific surface area of at least about 1500 $m^2/g$.

21. The method of claim 15 wherein said electrode has a roughness factor of at least about 10,000.

22. The method of claim 13 wherein said frequency is from about 10 Hz to about 100 Hz.

23. The method of claim 13 wherein said duty cycle is from about 10% to about 50%.

24. The method of claim 13 wherein said frequency is from about 10 Hz to about 100 Hz and said duty cycle is from about 10% to about 50%.

25. The method of claim 13 wherein said metal is selected from the group consisting of copper, silver, gold, zinc, nickel, mercury, lead, uranium, cadmium and chromium.

26. The method of claim 13 wherein said cathode comprises a packed bed of a particulate conducting material, said particulate material being coated with an ion exchange resin.

27. The method of claim 26 wherein said ion exchange resin is a perfluorinated sulfonic acid ionomer resin.

* * * * *